US011221676B2

(12) United States Patent
Song et al.

(10) Patent No.: US 11,221,676 B2
(45) Date of Patent: Jan. 11, 2022

(54) ELECTRONIC DEVICE WITH FOLDABLE DISPLAY AND CONTROL METHOD THEREOF

(71) Applicant: Samsung Electronics Co., Ltd., Gyeonggi-do (KR)

(72) Inventors: Kwonho Song, Gyeonggi-do (KR); Jeongseok Lee, Gyeonggi-do (KR); Yonggu Lee, Gyeonggi-do (KR); Jaehwan Park, Gyeonggi-do (KR); Changkwan Yang, Gyeonggi-do (KR); Kihun Eom, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/732,933

(22) Filed: Jan. 2, 2020

(65) Prior Publication Data

US 2020/0218353 A1    Jul. 9, 2020

(30) Foreign Application Priority Data

Jan. 4, 2019   (KR) ................. 10-2019-0001377

(51) Int. Cl.
*G09G 5/00*  (2006.01)
*G06F 3/01*  (2006.01)
*G06F 3/041* (2006.01)
*G06F 1/16*  (2006.01)

(52) U.S. Cl.
CPC ............ *G06F 3/016* (2013.01); *G06F 1/1641* (2013.01); *G06F 3/04146* (2019.05); *G06F 2203/04102* (2013.01)

(58) Field of Classification Search
CPC ...... G06F 1/1677; G06F 1/1641; G06F 3/016; G06F 2203/04102

USPC ................................... 345/169, 173
See application file for complete search history.

(56) References Cited

U.S. PATENT DOCUMENTS

| 9,335,823 | B2 | 5/2016  | Modarres et al. |
| 9,405,368 | B2 | 8/2016  | Modarres et al. |
| 9,405,369 | B2 | 8/2016  | Modarres et al. |
| 9,524,030 | B2 | 12/2016 | Modarres et al. |
| 9,715,281 | B2 | 7/2017  | Modarres et al. |

(Continued)

FOREIGN PATENT DOCUMENTS

| KR | 1020140016073 | 2/2014 |
| KR | 10-1636565    | 7/2016 |
| KR | 1020180017388 | 2/2018 |

OTHER PUBLICATIONS

International Search Report dated Apr. 29, 2020 issued in counterpart application No. PCT/KR2019/018467, 3 pages.

*Primary Examiner* — Jennifer T Nguyen
(74) *Attorney, Agent, or Firm* — The Farrell Law Firm, P.C.

(57) ABSTRACT

A foldable electronic device is provided, which includes a hinge structure, a first housing that is connected to the hinge structure, a second housing that is connected to the hinge, a first vibration element disposed in the first housing, a first motion sensor disposed adjacent to the first vibration element, a second motion sensor disposed in the second housing, a processor, and a memory. The memory stores instructions that, when executed, cause the processor to control vibration intensity of the first vibration element, based on a first value measured from the first motion sensor and a second value measured from the second motion sensor.

17 Claims, 9 Drawing Sheets

(56) References Cited

U.S. PATENT DOCUMENTS

| | | |
|---|---|---|
| 9,823,833 B2 | 11/2017 | Grant et al. |
| 9,939,900 B2 | 4/2018 | Cruz-Hernandez et al. |
| 9,971,409 B2 | 5/2018 | Modarres et al. |
| 9,983,676 B2 | 5/2018 | Modarres et al. |
| 10,048,758 B2 | 8/2018 | Modarres et al. |
| 10,060,732 B2 | 8/2018 | Lee et al. |
| 10,152,088 B2 | 12/2018 | Ka et al. |
| 10,219,077 B2 | 2/2019 | Choi et al. |
| 10,248,210 B2 | 4/2019 | Modarres et al. |
| 10,458,782 B2 | 10/2019 | Lee et al. |
| 10,564,675 B2 | 2/2020 | Ka et al. |
| 2008/0303782 A1 | 12/2008 | Grant et al. |
| 2010/0245106 A1* | 9/2010 | Miller .................. G06F 1/1618 340/686.1 |
| 2014/0029017 A1 | 1/2014 | Lee et al. |
| 2017/0045996 A1 | 2/2017 | Ka et al. |
| 2017/0052566 A1 | 2/2017 | Ka et al. |
| 2017/0060248 A1 | 3/2017 | Modarres et al. |
| 2018/0035208 A1 | 2/2018 | Choi et al. |
| 2018/0181205 A1 | 6/2018 | Cruz-Hernandez et al. |
| 2018/0224941 A1 | 8/2018 | Modarres et al. |
| 2018/0246574 A1 | 8/2018 | Modarres et al. |
| 2018/0347968 A1 | 12/2018 | Lee et al. |
| 2019/0073035 A1 | 3/2019 | Modarres et al. |
| 2019/0171315 A1 | 6/2019 | Park et al. |
| 2019/0204924 A1 | 7/2019 | Modarres et al. |
| 2019/0310689 A1* | 10/2019 | Itoh ....................... G06F 1/1616 |
| 2020/0021675 A1* | 1/2020 | Cheng ..................... G08B 3/10 |
| 2020/0056881 A1 | 2/2020 | Lee et al. |

\* cited by examiner

ELECTRONIC DEVICE WITH FOLDABLE DISPLAY AND CONTROL METHOD THEREOF

CROSS-REFERENCE TO RELATED APPLICATION(S)

This application is based on and claims priority under 35 U.S.C. § 119 to Korean Patent Application No. 10-2019-0001377, filed on Jan. 4, 2019, in the Korean Intellectual Property Office, the entire disclosure of which is incorporated herein by reference.

BACKGROUND

1. Field

The disclosure relates generally to an electronic device with a foldable display and a control method thereof.

2. Description of Related Art

With the development of display technology, studies on an electronic device employing a flexible display have been conducted. For example, an electronic device including a flat panel display and a curved display extending from one side or opposite sides of the flat panel display has been studied.

Among electronic devices having a conventional flat panel display, there are electronic devices that are foldable about a hinge structure, such as a notebook computer or a flip phone. An electronic device having the folding-type structure may include a flat panel display disposed on one side or opposite sides of the hinge structure.

An electronic device may provide various types of feedback. For example, an electronic device may provide haptic feedback by using vibration. An electronic device, such as a mobile phone, may not include a physical input device, such as a keypad, to provide a large display, but may receive inputs using a touch sensor mounted on a display. In this case, the electronic device may provide haptic feedback in response to an input of a user, thereby providing improved user experience to the user.

In an electronic device having a foldable display, the shape of the electronic device may change depending on an open state or a closed state of the electronic device. Additionally, haptic feedback of the electronic device may change depending on the change in the shape of the electronic device. For example, when the electronic device is fully opened, the perceived intensity of the haptic feedback that a user experiences by may be relatively greater, e.g., due to an increase in the length of the electronic device, than when the electronic device is fully closed, e.g., due to a decrease in the length of the electronic device. Accordingly, unintended haptic feedback may be provided to a user depending on the open/closed state of the foldable display.

SUMMARY

The disclosure is made to address at least the above-mentioned problems and/or disadvantages and to provide at least the advantages described below.

In accordance with an aspect of the disclosure, a foldable electronic device is provided, which includes a hinge structure, a first housing that is connected to the hinge structure and that includes a first surface facing a first direction and a second surface facing a second direction opposite to the first direction, and a second housing that is connected to the hinge structure and folded about the hinge structure with the first housing and that includes a third surface facing a third direction and a fourth surface facing a fourth direction opposite to the third direction, in which in a folded state, the first surface faces the third surface and in an unfolded state, the third direction is the same as the first direction, a first vibration element disposed in a first portion of the first housing, a first motion sensor disposed in an area adjacent to the first vibration element in the first housing, a second motion sensor disposed in a second portion of the second housing, a processor operatively connected with the first vibration element, the first motion sensor, and the second motion sensor, and a memory operatively connected with the processor. The memory stores instructions that, when executed, cause the processor to control vibration intensity of the first vibration element, based on a first value measured from the first motion sensor and a second value measured from the second motion sensor.

In accordance with another aspect of the disclosure, a foldable electronic device is provided, which includes a hinge structure, a first housing that is connected to the hinge structure and that includes a first surface facing a first direction and a second surface facing a second direction opposite to the first direction, and a second housing that is connected to the hinge structure and folded about the hinge structure with the first housing and that includes a third surface facing a third direction and a fourth surface facing a fourth direction opposite to the third direction, in which in a folded state, the first surface faces the third surface and in an unfolded state, the third direction is the same as the first direction, a first motion sensor disposed in the first housing, a first vibration element disposed adjacent to the first motion sensor in the first housing, a second motion sensor disposed in the second housing, a processor operatively connected with the first vibration element, the first motion sensor, and the second motion sensor, and a memory operatively connected with the processor. The memory stores instructions that, when executed, cause the processor to provide a haptic pattern corresponding to a specified event by using the first vibration element in response to the specified event, obtain first vibration intensity corresponding to the haptic pattern by using the first motion sensor and the second motion sensor, and control second vibration intensity of the first vibration element, based on the obtained first vibration intensity.

In accordance with another aspect of the disclosure, an electronic device is provided, which includes a foldable housing that includes a hinge structure, a first housing that is connected to the hinge structure and that includes a first surface facing a first direction and a second surface facing a second direction opposite to the first direction, and a second housing that is connected to the hinge structure and folded about the hinge structure with the first housing and that includes a third surface facing a third direction and a fourth surface facing a fourth direction opposite to the third direction, in which in a folded state, the first surface faces the third surface and in an unfolded state, the third direction is the same as the first direction, a first motion sensor disposed in the first housing, a first vibration element disposed adjacent to the first motion sensor in the first housing, a second motion sensor disposed in the second housing, a second vibration element disposed adjacent to the second motion sensor in the second housing, a processor operatively connected with the first vibration element, the second vibration element, the first motion sensor, and the second motion sensor, and a memory operatively connected with the processor. The memory stores instructions that, when executed, cause the processor to provide a haptic pattern corresponding to a specified event by using at least one of the first vibration element or the second vibration element in response to the specified event, obtain first vibration intensity corresponding to the haptic pattern by using the first motion sensor and the second motion sensor, and control second vibration intensity of at least one of the first vibration element or the second vibration element, based on the obtained first vibration intensity.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
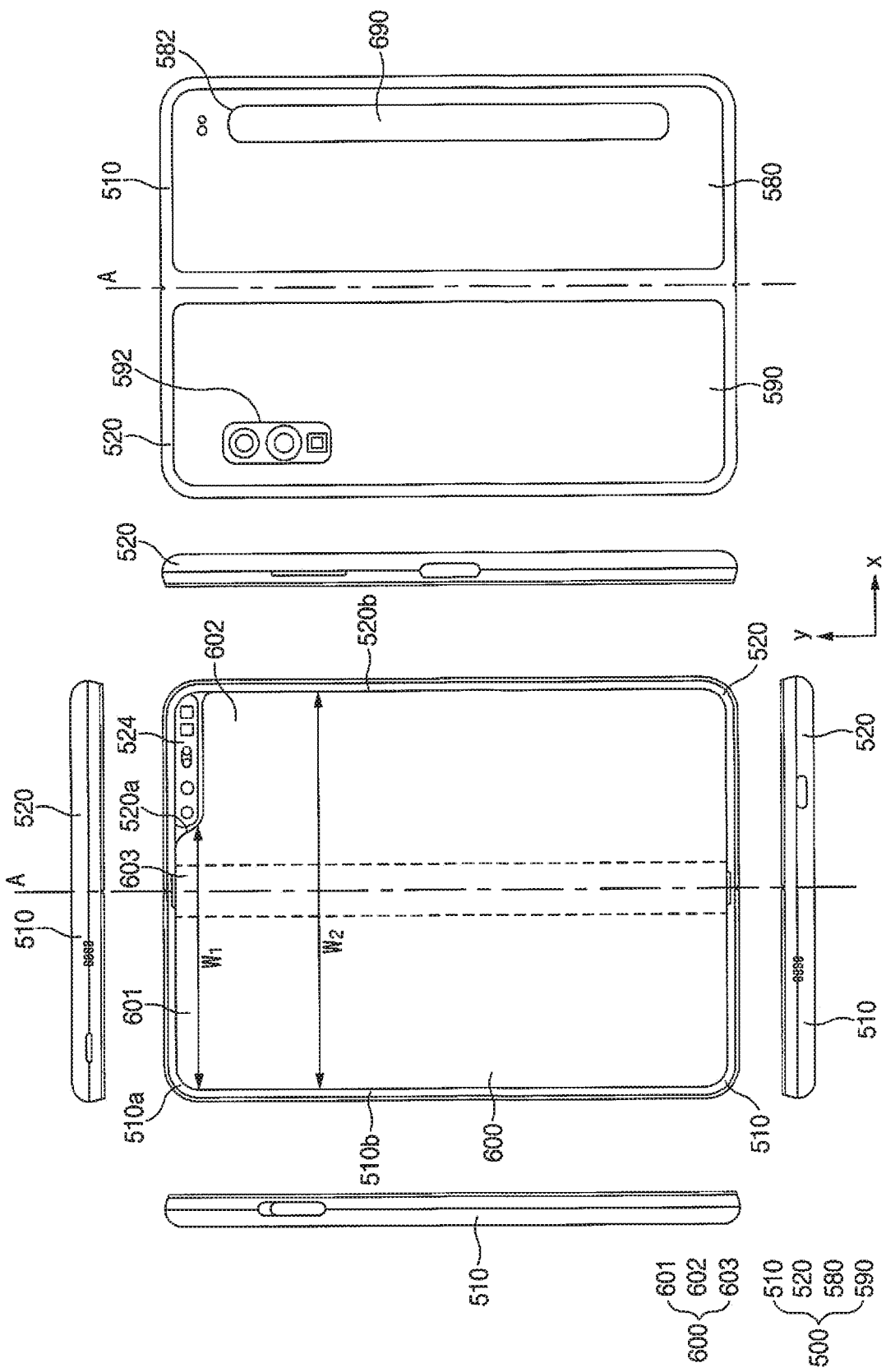
FIG. 1 illustrates an electronic device in an unfolded state according to an embodiment.

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be made without departing from the scope and spirit of the disclosure.

With regard to the drawings, identical or similar reference numerals may be used to refer to identical or similar components.

Figure 2:
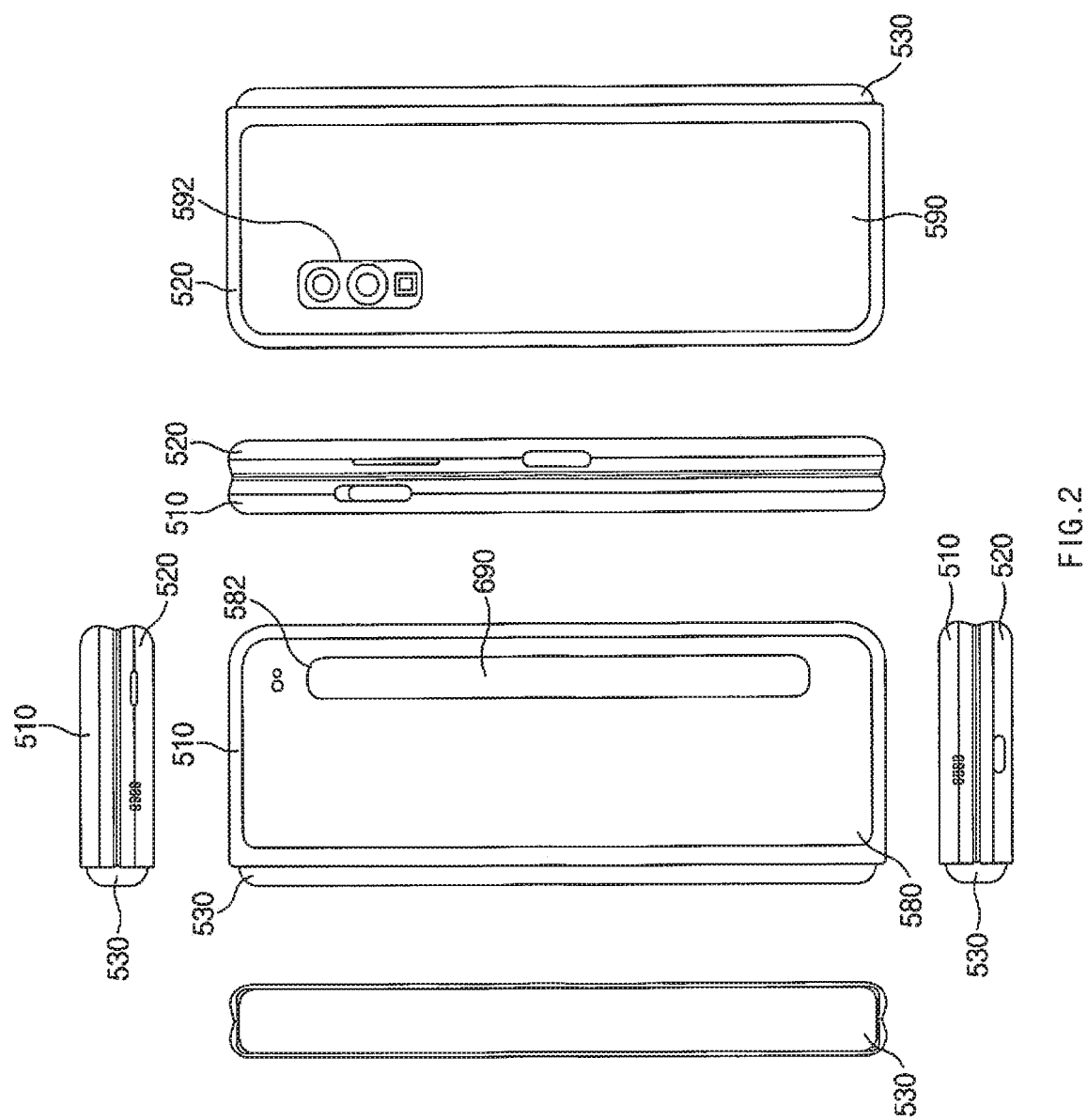
FIG. 2 illustrates an electronic device in a folded state according to an embodiment.

FIG. 1 illustrates an electronic device in an unfolded state according to an embodiment. FIG. 2 illustrates an electronic device in a folded state according to an embodiment.

Referring to FIGS. 1 and 2, an electronic device includes a foldable housing 500, a hinge cover 530 that covers a foldable portion of the foldable housing 500, and a flexible or foldable display 600 (hereinafter, simply referred to as the "display" 600) that is disposed in a space formed by the foldable housing 500. A surface on which the display 600 is disposed may be referred to as a first surface or a front surface of the electronic device. A surface opposite to the front surface may be referred to as a second surface or a rear surface of the electronic device. Further, surfaces that surround a space between the front surface and the rear surface may be referred to as third surfaces or side surfaces of the electronic device.

The foldable housing 500 includes a first housing structure 510, a second housing structure 520 including a sensor area 524, a first back cover 580, and a second back cover 590. The foldable housing 500 of the electronic device may be implemented by a combination and/or coupling of other shapes or components without being limited to the form and coupling illustrated in FIGS. 1 and 2. For example, the first housing structure 510 and the first back cover 580 may be integrally formed with each other, and the second housing structure 520 and the second back cover 590 may be integrally formed with each other.

The first housing structure 510 and the second housing structure 520 may be disposed on opposite sides of a folding axis (axis A) and may have shapes that are entirely symmetric to each other with respect to the folding axis A. The angle or distance between the first housing structure 510 and the second housing structure 520 may vary depending on whether the electronic device is in a flat, folded, or intermediate state. Unlike the first housing structure 510, the second housing structure 520 may additionally include the sensor area 524 in which various sensors are arranged, but may have a symmetrical shape in the other area.

As illustrated in FIG. 1, the first housing structure 510 and the second housing structure 520 may together form a recess in which the display 600 is received. Due to the sensor area 524, the recess may have two or more different widths in a direction perpendicular to the folding axis A.

For example, the recess may have (1) a first width w1 between a first portion 510a of the first housing structure 510 that is parallel to the folding axis A and a first portion 520a of the second housing structure 520 that is formed on the periphery of the sensor area 524 and (2) a second width w2 formed by a second portion 510b of the first housing structure 510 and a second portion 520b of the second housing structure 520 that does not correspond to the sensor area 524 and that is parallel to the folding axis A. The second width w2 may be greater than the first width w1. Basically, the first portion 510a of the first housing structure 510 and the first portion 520a of the second housing structure 520 that have asymmetrical shapes may form the first width w1 of the recess, and the second portion 510b of the first housing structure 510 and the second portion 520b of the second housing structure 520 that have symmetrical shapes may form the second width w2 of the recess.

The first portion 520a and the second portion 520b of the second housing structure 520 may have different distances from the folding axis A. The widths of the recess are not limited to the illustrated example. For example, the recess may have a plurality of widths due to the form of the sensor area 524 or asymmetrical portions of the first housing structure 510 and the second housing structure 520.

At least part of the first housing structure 510 and at least part of the second housing structure 520 may be formed of a metallic or non-metallic material having a selected stiffness to support the display 600.

The sensor area 524 may be formed to have a predetermined area adjacent to one corner of the second housing structure 520. However, the arrangement, shape, and size of the sensor area 524 are not limited to the illustrated example. Alternatively, the sensor area 524 may be provided in another corner of the second housing structure 520 or in any area between an upper corner and a lower corner of the second housing structure 520.

Components embedded in the electronic device to perform various functions may be exposed on the front surface of the electronic device though the sensor area 524 or through one or more openings formed in the sensor area 524. The components may include various types of sensors, such as a front camera, a receiver, and/or a proximity sensor.

The first back cover 580 may be disposed on one side of the folding axis A on the rear surface of the electronic device. The first back cover 580 may have a substantially rectangular periphery, and the periphery of the first back cover 580 may be surrounded by the first housing structure 510. Similarly, the second back cover 590 may be disposed on an opposite side of the folding axis A on the rear surface of the electronic device, and the periphery of the second back cover 590 may be surrounded by the second housing structure 520.

The first back cover 580 and the second back cover 590 may have substantially symmetrical shapes with respect to the folding axis (the axis A). However, the first back cover 580 and the second back cover 590 do not necessarily have to have mutually symmetrical shapes. Alternatively, the electronic device may include the first back cover 580 and the second back cover 590 in various shapes. The first back cover 580 may be integrally formed with the first housing structure 510, and the second back cover 590 may be integrally formed with the second housing structure 520.

The first back cover 580, the second back cover 590, the first housing structure 510, and the second housing structure 520 may form a space in which various components (e.g., a printed circuit board or a battery) of the electronic device are disposed. One or more components may be disposed, or visually exposed, on the rear surface of the electronic device. For example, at least part of a sub-display 690 may be visually exposed through a first rear area 582 of the first back cover 580. Alternatively, one or more components or sensors may be visually exposed through a second rear area 592 of the second back cover 590. The sensors may include a proximity sensor and/or a rear camera.

Referring to FIG. 2, the hinge cover 530 may be disposed between the first housing structure 510 and the second housing structure 520 and may be configured to hide an internal component (e.g., a hinge structure). The hinge cover 530 may be hidden by a portion of the first housing structure 510 and a portion of the second housing structure 520, or may be exposed to the outside, depending on a state (a flat state or a folded state) of the electronic device.

For example, when the electronic device is in an unfolded (or flat) state as illustrated in FIG. 1, the hinge cover 530 may not be exposed by being hidden by the first housing structure 510 and the second housing structure 520. However, when the electronic device is in a folded state (e.g., a fully folded state) as illustrated in FIG. 2, the hinge cover 530 may be exposed to the outside from between the first housing structure 510 and the second housing structure 520.

As another example, when the electronic device is in an intermediate state in which the first housing structure 510 and the second housing structure 520 are folded with a certain angle, the hinge cover 530 may be partially exposed to the outside from between the first housing structure 510 and the second housing structure 520. However, in this case, the exposed area may be smaller than that when the electronic device is in the fully folded state.

The hinge cover 530 may include a curved surface.

The display 600 may be disposed on the space formed by the foldable housing 500. For example, the display 600 may be seated on the recess formed by the foldable housing 500 and may form almost the entire front surface of the electronic device.

Accordingly, the front surface of the electronic device may include the display 600, and a partial area of the first housing structure 510 and a partial area of the second housing structure 520 that are adjacent to the display 600. Further, the rear surface of the electronic device may include the first back cover 580, a partial area of the first housing structure 510 that is adjacent to the first back cover 580, the second back cover 590, and a partial area of the second housing structure 520 that is adjacent to the second back cover 590.

The display 600 may refer to a display, at least a partial area of which is able to be deformed into a flat surface or a curved surface. The display 600 includes a folding area 603, a first area 601 disposed on one side of the folding area 603 (on the left side of the folding area 603 illustrated in FIG. 1), and a second area 602 disposed on an opposite side of the folding area 603 (on the right side of the folding area 603 illustrated in FIG. 1).

The areas of the display 600 illustrated in FIG. 1 are illustrative, and the display 600 may be divided into a different number of areas (e.g., two, four, or more areas) depending on the structure or function of the display 600. In FIG. 1, the areas of the display 600 are divided from each other by the folding area 603 extending parallel to the y axis or by the folding axis (the axis A). However, in another embodiment, the display 600 may be divided into areas with respect to another folding area (e.g., a folding area parallel to the x axis) or another folding axis (e.g., a folding axis parallel to the x axis).

The first area 601 and the second area 602 may have shapes that are entirely symmetric to each other with respect to the folding area 603. Unlike the first area 601, the second area 602 may include a notch that is cut according to the presence of the sensor area 524. However, in the other area, the second area 602 may be symmetric to the first area 601. Accordingly, the first area 601 and the second area 602 may include a portion having a symmetrical shape and a portion having an asymmetrical shape.

When the electronic device is in a flat state as illustrated in FIG. 1, the first housing structure 510 and the second housing structure 520 may be arranged to face the same direction while forming an angle of 180 degrees. The surface of the first area 601 of the display 600 and the surface of the second area 602 thereof may face the same direction (e.g., the forward direction of the electronic device) while forming an angle of 180 degrees. The folding area 603, together with the first area 601 and the second area 602, may form the same plane.

When the electronic device is in a folded state as illustrated in FIG. 2, the first housing structure 510 and the second housing structure 520 may be arranged to face each other. The surface of the first area 601 of the display 600 and the surface of the second area 602 thereof may face each other while forming a narrow angle (e.g., an angle between 0 degrees and 10 degrees). At least part of the folding area 603 may form a curved surface having a predetermined curvature.

When the electronic device is in an intermediate state, the first housing structure 510 and the second housing structure 520 may be arranged to form a certain angle therebetween. The surface of the first area 601 of the display 600 and the surface of the second area 602 thereof may form an angle that is greater than that in the folded state and is smaller than that in the flat state. At least part of the folding area 603 may form a curved surface having a predetermined curvature, and the curvature may be smaller than that in the folded state.

Figure 3:
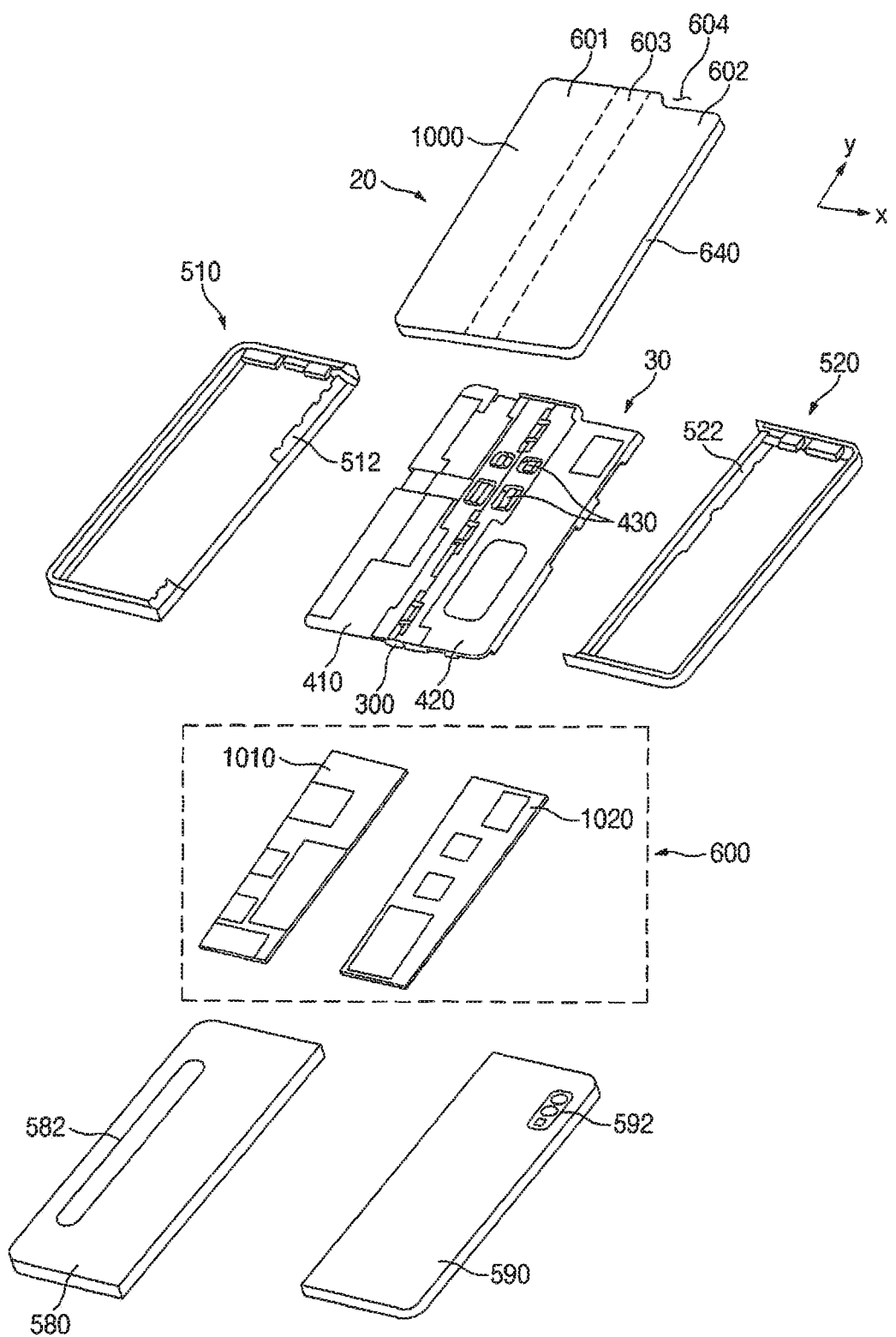
FIG. 3 illustrates an electronic device according to an embodiment.

FIG. 3 illustrates an electronic device according to an embodiment.

Referring to FIG. 3, the electronic device includes a display unit 20, a bracket assembly 30, a circuit board 1000, the first housing structure 510, the second housing structure 520, the first back cover 580, and the second back cover 590.

Herein, the display unit 20 may also be referred to as a display module or a display assembly.

The display unit 20 includes the display 600 and one or more plates or layers 640 on which the display 600 is seated. The plates 640 may be disposed between the display 600 and the bracket assembly 30. The display 600 may be disposed on at least part of one surface of the plates 640 (e.g., the upper surface with respect to FIG. 3). The plates 640 may be formed in a shape corresponding to the display 600. For example, partial areas of the plates 640 may be formed in a shape corresponding to a notch 604 of the display 600.

The bracket assembly 30 includes a first bracket 410, a second bracket 420, a hinge structure 300 disposed between the first bracket 410 and the second bracket 420, the hinge cover 530 that covers the hinge structure 300 when viewed from the outside, and wiring members 430 (e.g., flexible printed circuits (FPCs)) that traverse the first bracket 410 and the second bracket 420.

The bracket assembly 30 may be disposed between the plates 640 and the circuit board 1000. For example, the first bracket 410 may be disposed between the first area 601 of the display 600 and a first circuit board 1010. The second bracket 420 may be disposed between the second area 602 of the display 600 and a second circuit board 1020.

The wiring members 430 and at least part of the hinge structure 300 may be disposed inside the bracket assembly 30. The wiring members 430 may be arranged in a direction (e.g., the x-axis direction) across the first bracket 410 and the second bracket 420. The wiring members 430 may be arranged in a direction (e.g., the x-axis direction) that is perpendicular to the folding axis (e.g., the y-axis or the folding axis A of FIG. 1) of the folding area 603 of the electronic device.

The circuit board 1000 includes the first circuit board 1010 disposed on one side of the first bracket 410 and the second circuit board 1020 disposed on one side of the second bracket 420. The first circuit board 1010 and the second circuit board 1020 may be disposed in the space that is formed by the bracket assembly 30, the first housing structure 510, the second housing structure 520, the first back cover 580, and the second back cover 590. Components for implementing various functions of the electronic device may be mounted on the first circuit board 1010 and the second circuit board 1020.

The first housing structure 510 and the second housing structure 520 may be assembled together so as to be coupled to opposite sides of the bracket assembly 30 while the display unit 20 is coupled to the bracket assembly 30. The first housing structure 510 and the second housing structure 520 may be coupled with the bracket assembly 30 by sliding on the opposite sides of the bracket assembly 30.

The first housing structure 510 includes a first rotation support surface 512, and the second housing structure 520 includes a second rotation support surface 522 corresponding to the first rotation support surface 512. The first rotation support surface 512 and the second rotation support surface 522 may include a curved surface corresponding to a curved surface included in the hinge cover 530.

When the electronic device is in a flat state as illustrated in FIG. 1, the first rotation support surface 512 and the second rotation support surface 522 may cover the hinge cover 530 such that the hinge cover 530 is not exposed, or is minimally exposed, on the rear surface of the electronic device. However, when the electronic device is in a folded state as illustrated in FIG. 2, the first rotation support surface 512 and the second rotation support surface 522 may rotate along the curved surfaces included in the hinge cover 530 such that the hinge cover 530 is maximally exposed on the rear surface of the electronic device.

Figure 4:
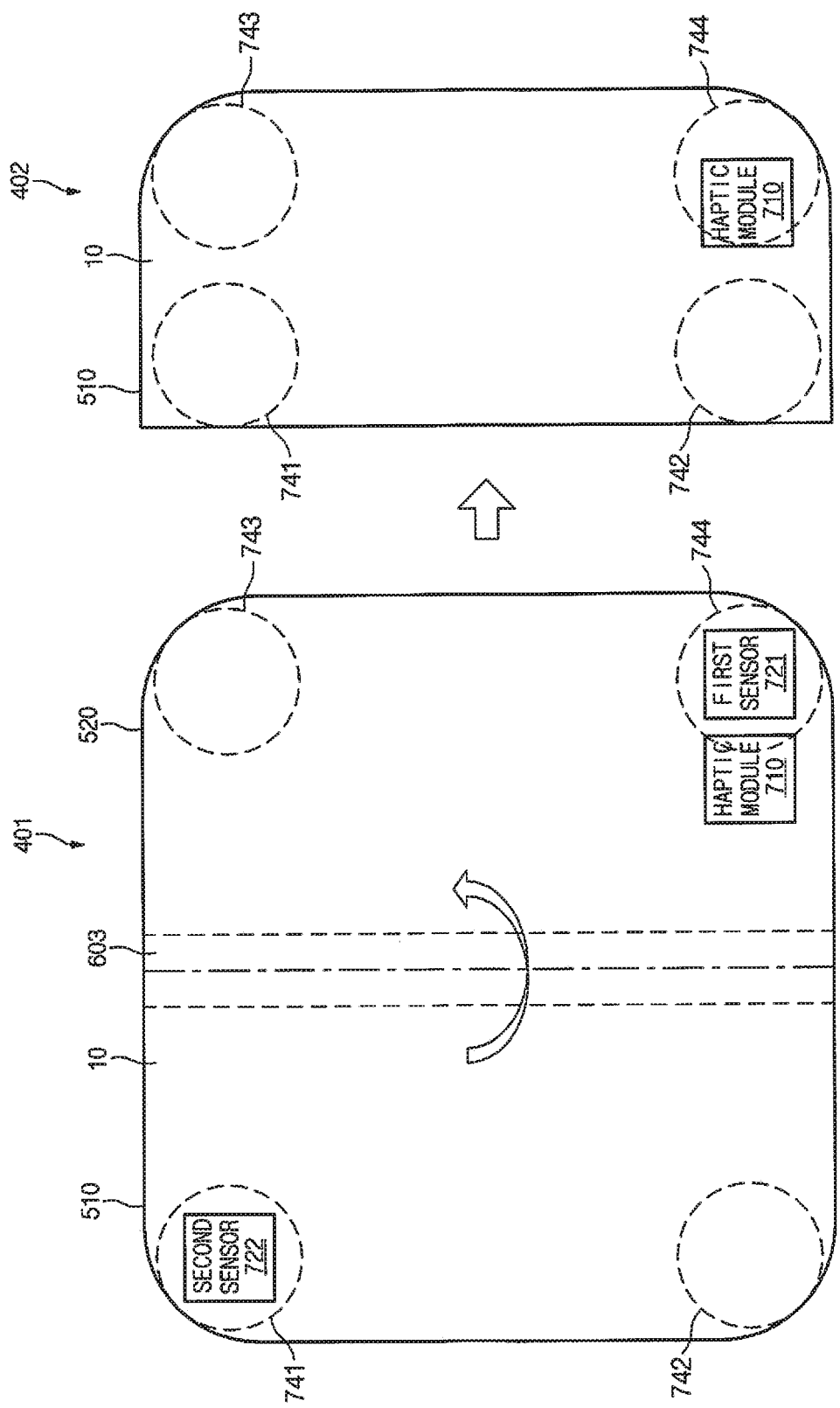
FIG. 4 illustrates an arrangement of a haptic module in an electronic device according to an embodiment.

FIG. 4 illustrates an arrangement of a haptic module in an electronic device according to an embodiment Referring to reference numeral 401 of FIG. 4, the electronic device is a foldable device including a foldable housing. The foldable housing includes the first housing structure 510 extending from the folding area 603 in a first direction and the second housing structure 520 extending from the folding area 603 in an opposite direction to the first direction. For example, the first housing structure 510 may include a first surface (e.g., corresponding to a portion of the front surface of the electronic device in a flat state) that faces the first direction and a second surface (e.g., corresponding to a portion of the rear surface of the electronic device in the flat state) that faces the opposite direction to the first direction. The second housing structure 520 may include a third surface (e.g., corresponding to a portion of the front surface of the electronic device in the flat state) that faces a second direction and a fourth surface (e.g., corresponding to a portion of the rear surface of the electronic device in the flat state) that faces an opposite direction to the second direction. The first housing structure 510 and the second housing structure 520 may be folded about the folding area 603. For example, the folding area 603 may include a hinge structure.

In the flat state, the electronic device includes four corners, a first corner (e.g., a corner adjacent to a first area 741) that is included in the first housing structure 510, a second corner (e.g., a corner adjacent to a second area 742) that is included in the first housing structure 510, a third corner (e.g., a corner adjacent to a third area 743) that is included in the second housing structure 520, and a fourth corner (e.g., a corner adjacent to a fourth area 744) that is included in the second housing structure 520. When the electronic device is folded, the first corner and the third corner may face each other, and the second corner and the fourth corner may face each other.

The electronic device includes a haptic module 710 mounted in the second housing structure 520. The haptic module 710 may be a vibration element for providing a specified haptic pattern. For example, the haptic pattern may be a vibration pattern for which at least one of the waveform, the frequency, the number of repetitions, the intensity, and/or the period is set. Different haptic patterns may be vibration patterns that differ from each other in terms of at least one of the waveform, the frequency, the number of repetitions, the intensity, and/or the period.

The electronic device may provide a specified haptic pattern using the haptic module 710. For example, in response to a specified event, the electronic device may provide a haptic pattern corresponding to the specified event. The haptic pattern may vary depending on the specified event. The specified event may include a touch input, an incoming message, an incoming call, a pop-up message, receipt of a specified signal, notification, and/or a change of state of the electronic device. The electronic device may provide the haptic pattern as haptic feedback on the specified event.

The electronic device includes a second sensor 722 located in the first housing structure 510 and a first sensor 721 located in the second housing structure 520. Each of the first sensor 721 and the second sensor 722 may be a motion sensor, e.g., an acceleration sensor. The electronic device may measure vibration (e.g., vibration intensity) using the first sensor 721 and the second sensor 722.

Each of the first sensor 721 and the second sensor 722 may include a gyro sensor that sense rotation of the first housing structure 510 and the second housing structure 520. For example, the electronic device may detect relative rotation between the first housing structure 710 and the second housing structure 720 using the first sensor 721 and the second sensor 722.

Each of the first sensor 721 and the second sensor 722 may be a motion sensor having six degrees of freedom. For example, each of the first sensor 721 and the second sensor 722 may be a six-axis sensor having an acceleration sensor and a gyro sensor combined with each other. The electronic device may measure a state of the electronic device using the first sensor 721 and the second sensor 722. For example, the state of the electronic device may include the orientation of the electronic device and/or the angle between the first housing structure 510 and the second housing structure 520. The electronic device may control haptic feedback, based on the state of the electronic device.

In FIG. 4, the first sensor 721 is located in an area adjacent to the haptic module 710 in the second housing structure 520. For example, the first sensor 721 is located adjacent to the fourth corner of the second housing structure 520 (e.g., the corner adjacent to the fourth area 744).

Alternatively, the second sensor 722 may be located in the first housing structure 510. For example, the second sensor 722 may be located adjacent to the first corner of the first housing structure 510 (e.g., the corner adjacent to the first area 741). The first sensor 721 and the second sensor 722 may be disposed so as not to overlap each other when the electronic device is folded. For example, the first sensor 721 and the second sensor 722 may be disposed so as not to overlap each other in the folded state when the electronic device is viewed from a side (e.g., the upper side, the lower side, the left side, or the right side) and/or the front side of the electronic device.

The electronic device may measure the intensity of haptic feedback transmitted to the first housing structure 510 and the second housing structure 520, by using the first sensor 721 and the second sensor 722. The electronic device may determine the angle between the first housing structure 510 and the second housing structure 520 using the first sensor 721 and the second sensor 722. The electronic device may measure the intensity of vibration provided by the haptic module 710, by using the first sensor 721 and the second sensor 722.

Referring to reference numeral 402, the electronic device may be folded about the folding area 603. As described above, the perceived intensities of vibrations transmitted to the respective corners of the electronic device by the same haptic feedback may vary depending on a state of the electronic device. For example, the intensities of vibrations transmitted to the first area 741, the second area 742, the third area 743, and the fourth area 744 by haptic feedback of the haptic module 710 in the folded state may be lower than those in the unfolded state. Even though the electronic device provides the same haptic pattern using the haptic module 710, haptic feedback experienced by a user may vary depending on a state (e.g., a folding angle) of the electronic device. According to an embodiment, the electronic device may control haptic feedback using the first sensor 721 and the second sensor 722, thereby providing constant haptic feedback to the user.

The electronic device may control haptic feedback obtained by using the first sensor 721 and the second sensor 722. The electronic device may adjust the intensity of the haptic feedback using the first sensor 721 and the second sensor 722. For example, the electronic device may adjust the intensity of the haptic feedback by adjusting the intensity of a waveform that is used for the haptic feedback and applied to the haptic module 710.

The electronic device may provide haptic feedback and may measure the intensity of vibration using the first sensor 721 and the second sensor 722 while providing the haptic feedback. For example, the electronic device may measure acceleration using the first sensor 721 and the second sensor 722. The electronic device may measure the intensity of the vibration, based on the measured acceleration.

The electronic device may measure the intensity of the vibration, based on a variation in the acceleration measured by the first sensor 721 and the second sensor 722. For example, the electronic device may measure a variation in acceleration (e.g., the variance of acceleration or the standard deviation of acceleration) as the intensity of the vibration.

Before measuring the acceleration of the haptic feedback, the electronic device may deactivate a low-pass filter set for the first sensor 721 and the second sensor 722. For example, the electronic device may perform low-pass filtering to reduce error values caused by the first sensor 721 and the second sensor 722. Because acceleration values in a high frequency band may be used to measure the intensity of the vibration, the electronic device may deactivate the low-pass filter or the low-pass filtering process that is associated with the first sensor 721 and the second sensor 722. After the deactivation of the low-pass filter or the low-pass filtering process, the electronic device may output specified haptic feedback using the haptic module 710 and may measure the intensity of the haptic feedback using the first sensor 721 and the second sensor 722.

Based on the intensity of the haptic feedback (e.g., the standard deviation of vibration) that is measured by the first sensor 721 and the second sensor 722, the electronic device may adjust the intensity of the haptic feedback. The electronic device may adjust the intensity of the haptic feedback, based at least on the average of the intensity of haptic feedback measured by the first sensor 721 and the intensity of haptic feedback measured by the second sensor 722.

The electronic device may obtain a correction value for adjusting the intensity of the haptic feedback. For example, the electronic device may determine the correction value, based on the average of the intensity (e.g., standard deviation) of the haptic feedback measured by the first sensor 711 and the intensity (e.g., standard deviation) of the haptic feedback measured by the second sensor 722, and the intensity (e.g., standard deviation) of target haptic feedback. For example, the electronic device may determine a value obtained by dividing the intensity of the target haptic feedback by the average value to be the correction value.

The electronic device may adjust the intensity of the haptic feedback by multiplying a wave used for the haptic feedback by the correction value. For example, the electronic device may adjust the magnitude of voltage applied to the haptic module 710 to provide the haptic feedback, by using the correction value.

The electronic device may adjust the intensity of the haptic feedback in real time. For example, the electronic device, after providing the haptic feedback, may measure the intensity of the haptic feedback and may adjust the intensity of the haptic feedback by using the measured intensity of the haptic feedback.

The electronic device may adjust the intensity of the haptic feedback, based on a specified correction value. For example, the electronic device may include a database for a correction value of haptic feedback depending on a state of the electronic device. The database may include correction value information depending on a state of the electronic device (e.g., the orientation of the electronic device and/or the angle between the first housing structure 510 and the second housing structure 520). The electronic device, when providing haptic feedback, may determine a state of the electronic device using the first sensor 721 and the second sensor 722 and may provide haptic feedback adjusted by using correction value information corresponding to the determined state of the electronic device. The electronic device may add a state of the electronic device obtained previously and a correction value corresponding thereto to the database. Alternatively, the electronic device may update a corresponding correction value of the database by using the state of the electronic device obtained previously and the correction value corresponding thereto.

The electronic device may adjust the intensity of the haptic feedback, based on a specified condition. For example, the electronic device may adjust the intensity of the haptic feedback when the angle between the first housing structure 510 and the second housing structure 520 is within a specified first range, and may not adjust the intensity of the haptic feedback when the angle is within a specified second range. The lower limit of the first range may exceed the upper limit of the second range.

As another example, the electronic device may not adjust the intensity of the haptic feedback in a folded state (e.g., a state in which the angle between the first housing structure 510 and the second housing structure 520 is smaller than a specified angle) and may adjust the intensity of the haptic feedback in an open state (a state in which the angle between the first housing structure 510 and the second housing structure 520 is larger than or equal to the specified angle).

As another example, the electronic device may adjust the intensity of the haptic feedback, based on user settings.

Figure 5:
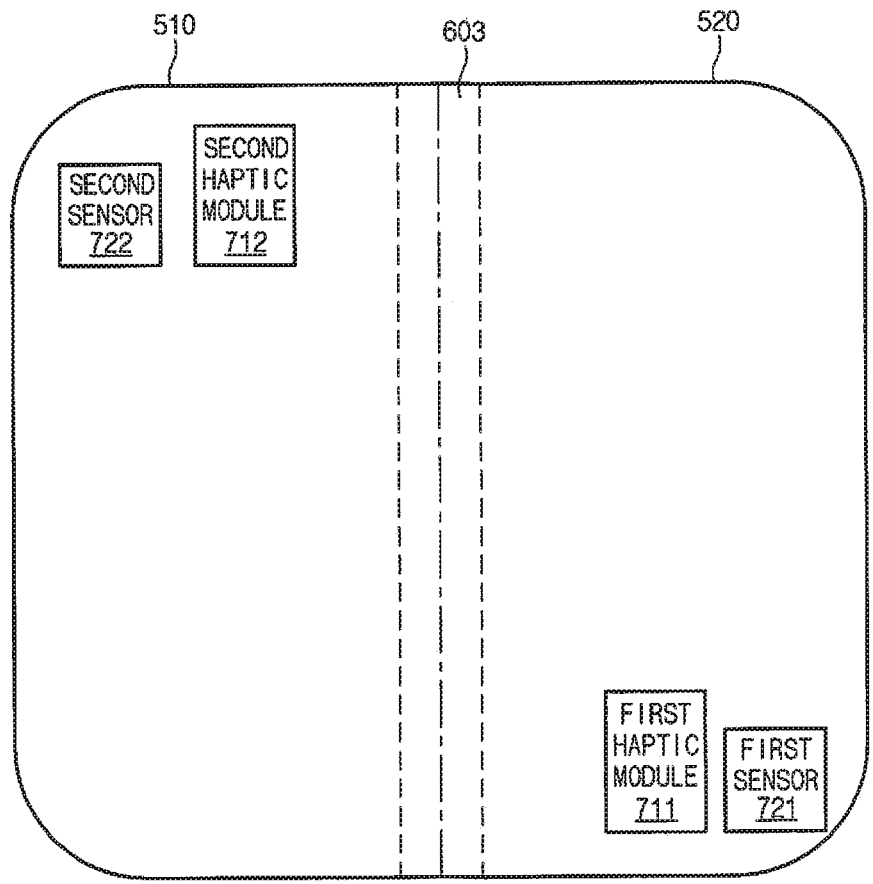
FIG. 5 illustrates an arrangement of haptic modules in an electronic device according to an embodiment.

FIG. 5 illustrates an arrangement of haptic modules in an electronic device according to an embodiment.

Referring to FIG. 5, the electronic device includes a first haptic module 711 and a second haptic module 712. For example, the first haptic module 711 is disposed in the second housing structure 520, adjacent to the first sensor 721, and the second haptic module 712 is disposed in the first housing structure 510, adjacent to the second sensor 722.

The first haptic module 711 and the second haptic module 712 may be vibration elements for providing a specified haptic pattern. The electronic device may provide the specified haptic pattern using the first haptic module 711 and/or the second haptic module 712. The positions of the first haptic module 711 and the second haptic module 712 illustrated in FIG. 5 are illustrative, and embodiments of the disclosure are not limited thereto.

The first haptic module 711 and the second haptic module 722 may be disposed so as not to overlap each other in a folded state when the electronic device is viewed from a side (e.g., the upper side, the lower side, the left side, or the right side) and/or the front side of the electronic device.

The electronic device may measure the intensities of vibrations provided by the first haptic module 711 and the second haptic module 712, by using the first sensor 721 and the second sensor 722. The electronic device may adjust the intensity of haptic feedback by adjusting the intensity of a waveform (e.g., the magnitude of voltage) that is applied to the first haptic module 711 and/or the second haptic module 712. For example, the electronic device may adjust the magnitude of voltage that is applied to the first haptic module 711 and/or the second haptic module 712 to provide the haptic feedback, by using a correction value based on measurement values of the first sensor 721 and the second sensor 722.

The electronic device may determine a haptic module for providing haptic feedback, based on a state of the electronic device (e.g., the orientation of the electronic device and/or the angle between the first housing structure 510 and the second housing structure 520). For example, the electronic device may provide haptic feedback by selectively driving one of the first haptic module 711 and the second haptic module 712, based on a state of the electronic device.

When providing haptic feedback using one haptic module among a plurality of haptic modules, the electronic device may adjust the intensity of the haptic feedback. When providing haptic feedback using the plurality of haptic modules, the electronic device may refrain from adjusting the intensity of the haptic feedback, and when providing haptic feedback using some of the plurality of haptic modules, the electronic device may adjust the intensity of the haptic feedback.

Figure 6:
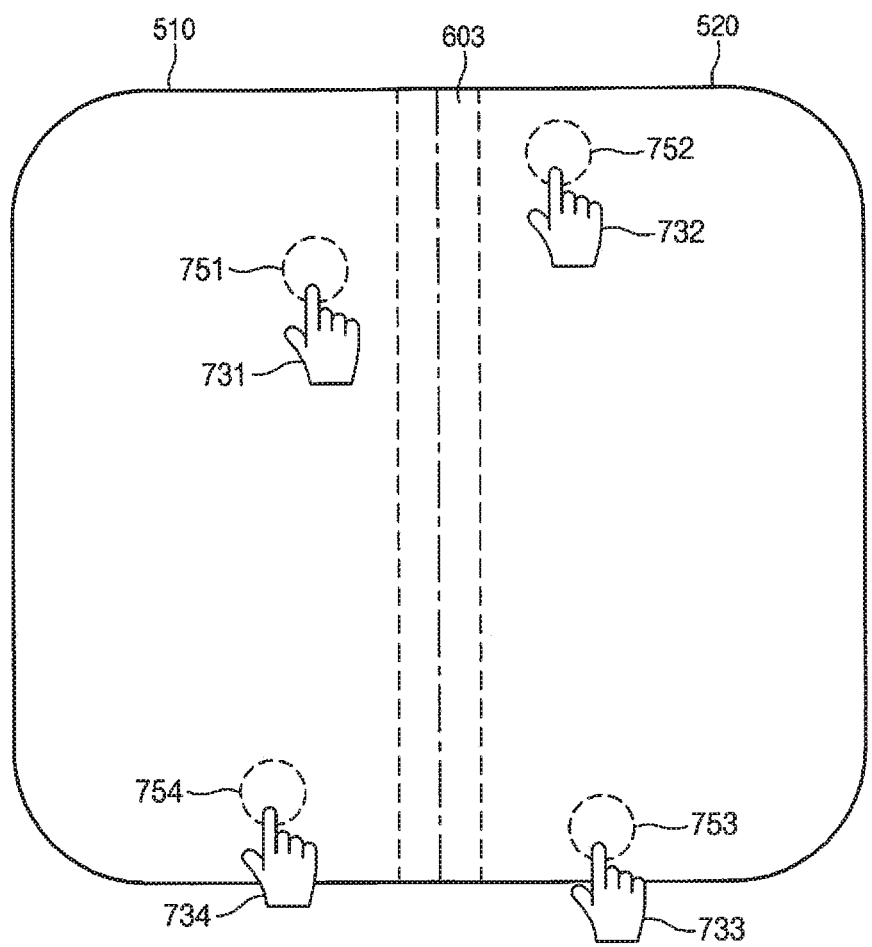
FIG. 6 illustrates a haptic feedback providing environment based on an input according to an embodiment.

FIG. 6 illustrates a haptic feedback providing environment based on an input according to an embodiment.

Referring to FIG. 6, the electronic device may adjust the intensity of haptic feedback, based on an input. For example, the electronic device may provide haptic feedback, based on the position of a touch input to the display. In a flat state, the display may be disposed over at least part of the first housing structure 510 and at least part of the second housing structure 520. The electronic device may determine whether to adjust the intensity of the haptic feedback, based on the position of the input. For example, when the position of the input is adjacent to a haptic module, the electronic device may refrain from adjusting the intensity of the haptic feedback on the input.

For example, in electronic device of FIG. 4, a first input 731 is farther away from the haptic module 710 than a third input 733, and therefore the electronic device may make an adjustment such that the intensity of haptic feedback on the first input 731 is higher than the intensity of haptic feedback on the third input 733. The electronic device may refrain from adjusting the intensity of the haptic feedback on the third input 733 because the third input 733 is located at a position adjacent to the haptic module (e.g., within a specified distance from the haptic module or at a position in a specified area including the haptic module).

As another example, in the electronic device of FIG. 5, the first input 731 is input to a position adjacent to a second haptic module 712 (e.g., within a specified distance from the second haptic module 712 or at a position in a specified area including the second haptic module 712), and therefore the electronic device may refrain from adjusting the intensity of haptic feedback on the first input 731. The third input 733 is input to a position adjacent to a first haptic module 711 (e.g., within a specified distance from the first haptic module 711 or at a position in a specified area including the first haptic module 711), and therefore the electronic device may refrain from adjusting the intensity of haptic feedback on the third input 733.

The electronic device may adjust the intensity of haptic feedback, based on the position of a touch input and a state of the electronic device. For example, the electronic device may calculate an internally dividing point between the intensity of haptic feedback measured by the first sensor 721 and the intensity of haptic feedback measured by the second sensor 722, based on the position of an input and may calculate a correction value depending on the intensity of target haptic feedback. As another example, the electronic device may adjust the intensity of haptic feedback by modifying a correction value depending on a state of the electronic device that is stored in a database, based on the position of a touch input, the position of the first sensor 721, and the position of the second sensor 722.

The electronic device may adjust the intensity of haptic feedback, based on a touch input to one area among a plurality of areas. For example, the electronic device may include a touch input area (e.g., a display) that is logically or physically divided into a plurality of areas. Correction values or haptic feedback intensity values may be preset for the plurality of areas, and depending on which of the plurality of areas receives a touch input, the electronic device may provide haptic feedback using the corresponding correction value or intensity value of the corresponding area.

The electronic device may include a touch input area that includes a first area 751, a second area 752, a third area 753, and a fourth area 754. For example, a representative value (e.g., a correction value or haptic feedback intensity) that is set for the first area 751 may differ from a representative value that is set for the fourth area 754. For example, for the first input 731 to the first area 751, the electronic device may adjust the intensity of haptic feedback using the representative value set for the first area 751. For example, for a fourth input 734 to the fourth area 754, the electronic device may adjust the intensity of haptic feedback using the representative value set for the fourth area 754.

When the electronic device includes the haptic module as illustrated in FIG. 4, the haptic feedback intensity set for the first area 751 may be higher than the haptic feedback intensity set for the third area 753. The haptic feedback intensities set for the second area 752 and the fourth area 754 may be lower than the haptic feedback intensity set for the first area 751 and may be higher than the haptic feedback intensity set for the third area 753. For example, the haptic feedback intensities set for the second area 752 and the fourth area 754 may correspond to the average of the haptic feedback intensity set for the first area 751 and the haptic feedback intensity set for the third area 753.

Figure 7:
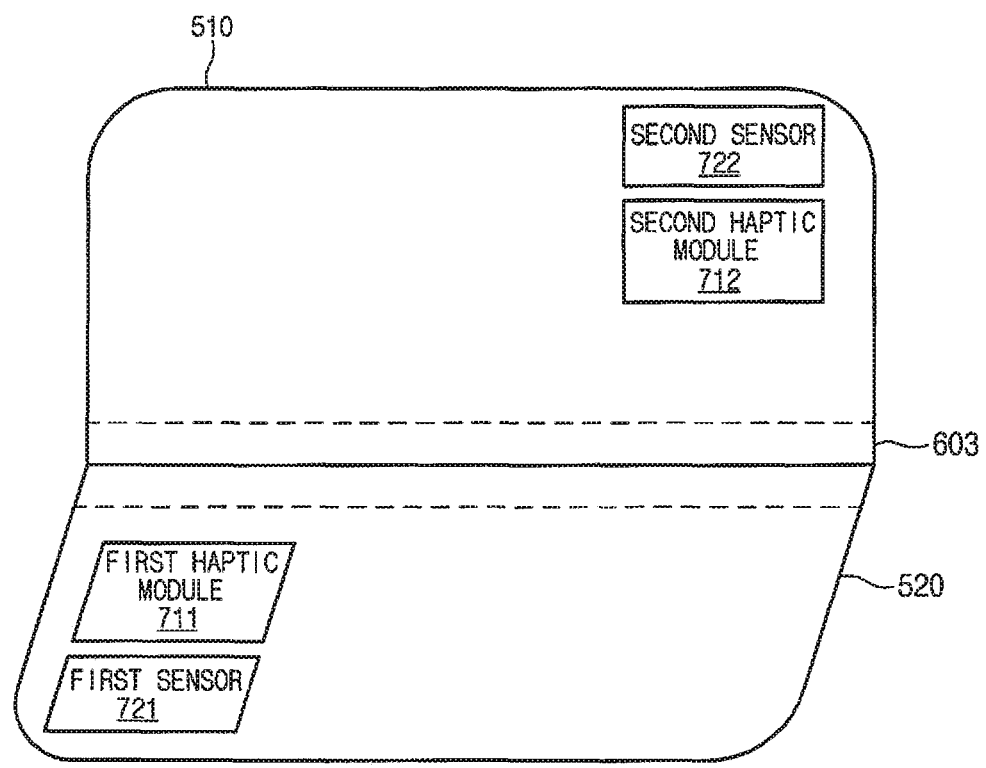
FIG. 7 illustrates a haptic feedback providing environment based on a folded state of an electronic device according to an embodiment.

FIG. 7 illustrates a haptic feedback providing environment based on a folded state of an electronic device according to an embodiment.

Referring to FIG. 7, the electronic device may provide different haptic feedback, based on the folded state. For example, when the electronic device includes the first haptic module 711 and the second haptic module 712, the electronic device may determine which of the first haptic module 711 and the second haptic module 712 provides haptic feedback, based on a state of the electronic device.

The electronic device may provide haptic feedback using one of the first haptic module 711 and the second haptic module 712 when the angle between the first housing structure 510 and the second housing structure 520 corresponds to a specified range (e.g., any angle range between an open state and a closed state). For example, when the angle between the first housing structure 510 and the second housing structure 520 corresponds to the specified range, the electronic device may determine which of the first housing structure 510 and the second housing structure 520 corresponds to the bottom surface of the electronic device. The electronic device may determine a housing structure corresponding to the bottom surface of the electronic device by using the first sensor 721 and the second sensor 722. For example, the bottom surface may be a surface substantially parallel to the plane on which the electronic device is placed at present or a surface substantially parallel to the plane perpendicular to the direction of gravitational acceleration.

The electronic device may provide haptic feedback using a haptic module included in the housing structure that does not correspond to the bottom surface. For example, when the second housing structure 520 is determined to correspond to the bottom surface, the electronic device may provide haptic feedback using the second haptic module 712. By providing the haptic feedback using the haptic module of the housing structure that does not correspond to the bottom surface, noise between the electronic device and the floor due to the haptic feedback may be prevented.

The electronic device may determine an operating mode of the electronic device, based on a state of the electronic device (e.g., the orientation of the electronic device and the angle between the first housing structure 510 and the second housing structure 520) and may provide haptic feedback depending on the operating mode. For example, when the angle between the first housing structure 510 and the second housing structure 520 corresponds to a specified range (e.g., any angle range between an open state and a closed state) and one housing structure is used as the bottom surface of the electronic device, the electronic device may determine that the operating mode of the electronic device is a table mode. In the table mode, the electronic device may provide haptic feedback using a haptic module located in a housing structure that does not correspond to the bottom surface.

According to an embodiment, an electronic device may include a foldable housing. The foldable housing may include a hinge structure, a first housing that is connected to the hinge structure and that includes a first surface facing a first direction and a second surface facing a second direction opposite to the first direction, and a second housing that is connected to the hinge structure and that includes a third surface facing a third direction and a fourth surface facing a fourth direction opposite to the third direction. The first housing and the second housing may be folded about the hinge structure. In a folded state, the first surface of the first housing and the third surface of the second housing may face each other, and in an unfolded state, the third direction and the first direction may be the same.

The electronic device may include a first vibration element that is disposed in a first portion of the first housing, a first motion sensor, a second motion sensor, a processor, and a memory.

The first motion sensor may be disposed in an area adjacent to the first vibration element in the first housing, and the second motion sensor may be disposed in a second portion of the second housing. Each of the first motion sensor and the second motion sensor may include an acceleration sensor (e.g., an acceleration sensor having six degrees of freedom) and/or a gyro sensor.

When viewed from above the first surface and the third surface in the unfolded state, the foldable housing may include a first corner and a second corner of the first housing and a third corner and a fourth corner of the second housing. In the folded state, the first corner and the third corner may face each other, and the second corner and the fourth corner may face each other. The first motion sensor may be disposed adjacent to the first corner, and the second motion sensor may be disposed adjacent to the fourth corner.

For example, the first vibration element may provide haptic feedback.

The processor may be operatively connected with the first motion sensor, the second motion sensor, and the first vibration element.

The electronic device may include a second vibration element that is disposed in an area adjacent to the second motion sensor in the second housing. For example, the processor of the electronic device and the second vibration element may be operatively connected together.

The electronic device may include a display that is disposed over at least part of the first surface and at least part of the third surface.

The memory may be operatively connected with the processor. The memory may store instructions that, when executed, cause the processor to perform operations of the electronic device that will be described below.

Figure 8:
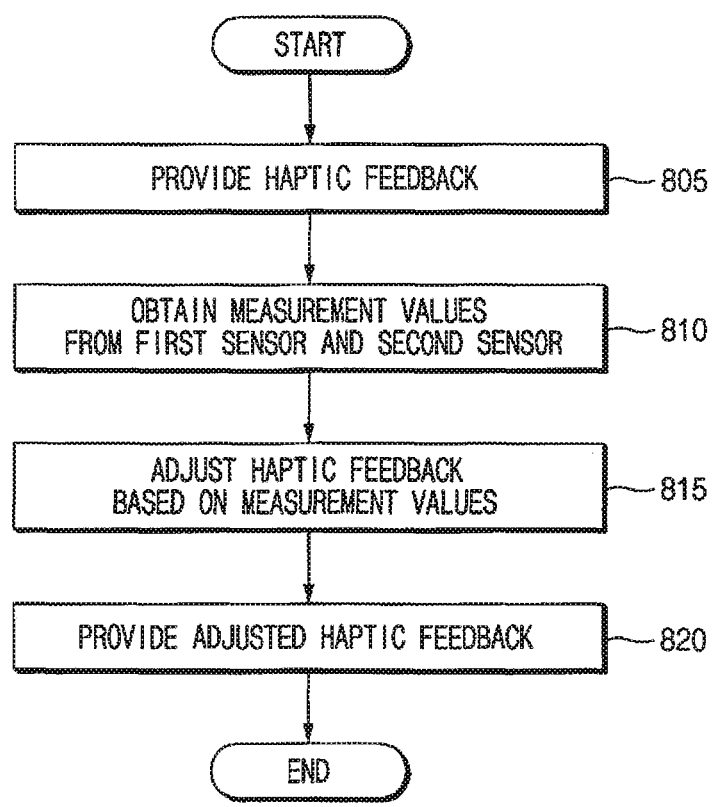
FIG. 8 illustrates a flowchart of a method for providing haptic feedback by an electronic device according to an embodiment.

FIG. 8 illustrates a flowchart of a method for providing haptic feedback by an electronic device according to an embodiment.

Referring to FIG. 8, in step 805, the electronic device provides haptic feedback. For example, in response to a specified event, the electronic device provides a haptic pattern corresponding to the specified event by using the first vibration element. When the electronic device includes the first vibration element and the second vibration element, the electronic device may provide haptic feedback corresponding to the haptic pattern by using the first vibration element and the second vibration element.

In step 810, the electronic device obtains measurement values from the first motion sensor and the second motion sensor. For example, the electronic device obtains measurement values of vibration intensity corresponding to the haptic feedback. The electronic device may obtain the intensity of the haptic feedback, based on a variation (e.g., standard deviation) in acceleration obtained from the first motion sensor and the second motion sensor.

In step 815, the electronic device adjusts the haptic feedback, based on the measurement values. For example, the electronic device adjusts the intensity of the haptic feedback (e.g., vibration intensity), based on a first value from the first motion sensor and a second value from the second motion sensor. The electronic device may control the vibration intensity of the first vibration element and/or the second vibration element.

In step 820, the electronic device provides the adjusted haptic feedback. For example, the electronic device provides haptic feedback having the adjusted intensity.

According to an embodiment, an electronic device may detect a state of the electronic device (e.g., the orientation of the electronic device and the angle between the first housing and the second housing) by using a first motion sensor and a second motion sensor. Based on values measured by the first motion sensor and the second motion sensor, the electronic device may determine whether the angle between the first housing and the second housing is within a specified range and one of the first housing and the second housing is used as the bottom surface of the electronic device. The electronic device may provide haptic feedback using one vibration element belonging to a portion (e.g., the first housing or the second housing) of the foldable housing that does not correspond to the bottom surface.

The electronic device may control the vibration intensity of the vibration element, based on the position of a touch input to the display and the intensity of vibration.

Figure 9:
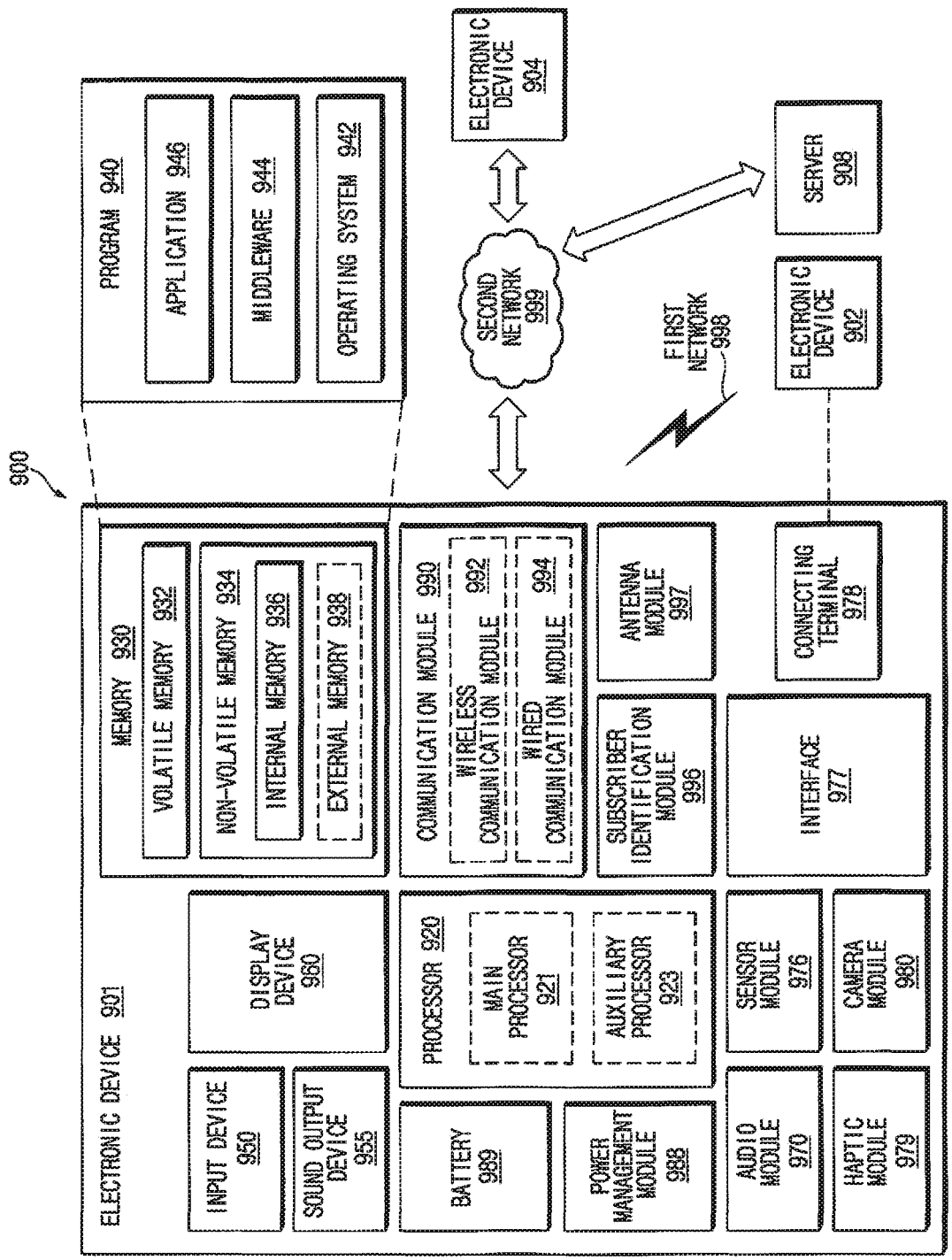
FIG. 9 illustrates an electronic device in a network environment according to various embodiments.

FIG. 9 is a block diagram illustrating an electronic device 901 in a network environment 900 according to various embodiments.

Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, Wi-Fi direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

A method according to various embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The above-described embodiments of the disclosure provide haptic feedback to a user on an electronic device including a foldable display, i.e., a foldable electronic device.

The foldable electronic device provides haptic feedback based on an open or closed (unfolded or folded) state of the foldable electronic device, thereby providing improved user experience.

In addition, the foldable electronic device provides haptic feedback based on the position of an input, thereby providing improved user experience.

In addition, the disclosure may provide various effects that are directly or indirectly recognized.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable electronic device, comprising:
a hinge structure;
a first housing connected to the hinge structure, the first housing including a first surface facing a first direction and a second surface facing a second direction opposite to the first direction;
a second housing connected to the hinge structure, the second housing including a third surface facing a third direction and a fourth surface facing a fourth direction opposite to the third direction, and the second housing being configured to be folded about the hinge structure with the first housing, wherein in a folded state, the first surface faces the third surface, and in an unfolded state, the third direction is the same as the first direction;
a display disposed over at least part of the first surface and at least part of the third surface;
a first vibration element for emitting a vibration pattern, wherein the first vibration element is disposed in a first portion of the first housing;
a first motion sensor disposed adjacent to the first vibration element in the first housing;
a second motion sensor disposed in a second portion of the second housing;
a processor operatively connected with the display, the first vibration element, the first motion sensor, and the second motion sensor; and
a memory operatively connected with the processor,
wherein the memory stores instructions that, when executed, cause the processor to:
in response to receiving a touch input on the display, control the first vibration element to emit a vibration pattern;
control the first motion sensor to measure a first intensity value of the vibration pattern emitted by the first vibration element and the second motion sensor to measure a second intensity value of the vibration pattern emitted by the first vibration element;
determine a third intensity value of the vibration pattern to be emitted from the first vibration element, based on the first intensity value and a distance between a touch position of the touch input and the first vibration element; and control the first vibration element to emit to vibration pattern that is changed based on the determine third intensity value.

2. The foldable electronic device of claim 1, wherein the first housing includes a first corner and a second corner,
wherein the second housing includes a third corner and a fourth corner,
wherein in the folded state, the first corner and the third corner face each other, and the second corner and the fourth corner face each other,
wherein the first motion sensor is disposed adjacent to the first corner, and
wherein the second motion sensor is disposed adjacent to the fourth corner.

3. The foldable electronic device of claim 1, wherein each of the first motion sensor and the second motion sensor includes an acceleration sensor.

4. The foldable electronic device of claim 3, wherein the acceleration sensor has six degrees of freedom (DOF).

5. The foldable electronic device of claim 4, wherein the instructions, when executed, further cause the processor to detect a state of the foldable electronic device using the first motion sensor and the second motion sensor, and
wherein the state of the foldable electronic device includes an orientation of the foldable electronic device and an angle between the first housing and the second housing.

6. The foldable electronic device of claim 5, further comprising a second vibration element disposed adjacent to the second motion sensor in the second housing,
wherein the processor is operatively connected with the second vibration element.

7. The foldable electronic device of claim 6, wherein the instructions, when executed, further cause the processor to:
determine whether the angle between the first housing and the second housing is within a specified range, based on the first intensity value and the second intensity value,
determine whether one of the first housing and the second housing is used as a bottom surface of the foldable electronic device, based on the first intensity value and the second intensity value, and
emit vibration using one of the first vibration element and the second vibration element that belongs to a portion of the foldable housing that does not correspond to the bottom surface, when it is determined that the angle is within the specified range and one of the first housing and the second housing is used as the bottom surface.

8. A foldable electronic device, comprising:
a hinge structure;
a first housing connected to the hinge structure, the first housing including a first surface facing a first direction and a second surface facing a second direction opposite to the first direction;
a second housing connected to the hinge structure, the second housing including a third surface facing a third direction and a fourth surface facing a fourth direction opposite to the third direction, and the second housing being configured to be folded about the hinge structure with the first housing, wherein in a folded state, the first surface faces the third surface, and in an unfolded state, the third direction is the same as the first direction;
a display disposed over at least part of the first surface and at least part of the third surface;
a first motion sensor disposed in the first housing;
a first vibration element for emitting a haptic pattern, wherein the first vibration element is disposed adjacent to the first motion sensor in the first housing;

a second motion sensor disposed in the second housing;
a second vibration element for emitting the haptic pattern, wherein the second vibration element is disposed adjacent to the second motion sensor in the second housing;
a processor operatively connected with the display, the first vibration element, the second vibration element, the first motion sensor, and the second motion sensor; and
a memory operatively connected with the processor,
wherein the memory stores instructions that, when executed, cause the processor to:
control the first vibration element to emit the haptic pattern from at least one of the first vibration element or the second vibration element, wherein the haptic pattern corresponds to a specified event,
determine a state of the electronic device based on a part of first information generated by the first motion sensor and second motion sensor, wherein the state of the electronic device includes an orientation of the electronic device and an angle between the first housing and the second housing;
select one of the first vibration element and the second vibration element, based on the determined state of the electronic device;
measure a first intensity value of the haptic pattern based on a part of second information generated by the first motion sensor and second motion sensor;
determine a second intensity value of the haptic pattern to be emitted from the selected vibration element, based on the first intensity value of the haptic pattern; and
control the selected vibration element to emit the haptic pattern that is changed based on the determined second intensity value,
wherein if the specified event includes a touch input on the display, the processor is further configured to determine the second intensity value of the haptic pattern to be emitted from the selected vibration element, based on the first intensity value and a distance between a touch position of the touch input and the selected vibration element.

9. The foldable electronic device of claim 8, wherein the first housing includes a first corner and a second corner,
wherein the second housing includes a third corner and a fourth corner,
wherein the first corner and the third corner face each other, and the second corner and the fourth corner face each other, in the folded state,
wherein the first motion sensor is disposed adjacent to the first corner, and
wherein the second motion sensor is disposed adjacent to the fourth corner.

10. The foldable electronic device of claim 8, wherein each of the first motion sensor and the second motion sensor includes an acceleration sensor and a gyro sensor.

11. The foldable electronic device of claim 8, wherein the instructions, when executed, further cause the processor to:
determine whether the angle between the first housing and the second housing is within a specified range, based on the determined state of the electronic device,
determine whether one of the first housing and the second housing is used as a bottom surface of the electronic device, based on the determined state of the electronic device; and
select, as a vibration element for emitting the haptic pattern, the vibration element belonging to the first housing or the second housing that is not used as the bottom surface, when it is determined that the angle is within the specified range and one of the first housing and the second housing is used as the bottom surface.

12. A method for operating a foldable electronic device including a first housing connected to a hinge structure, a second housing connected to the hinge structure, a display, a first vibration element disposed in a first portion of the first housing and configured to emit a vibration pattern, a first motion sensor disposed adjacent to the first vibration element in the first housing and a second motion sensor disposed in a second portion of the second housing, the method comprising:
in response to receiving a touch input on the display, controlling the first vibration element to emit a vibration pattern;
controlling the first motion sensor to measure a first intensity value of the vibration pattern emitted by the first vibration element, and the second motion sensor to measure a second intensity value of the vibration pattern emitted by the first vibration element;
determining a third intensity value of the vibration pattern to be emitted from the first vibration element, based on the first intensity value, the second intensity value and a distance between a touch position of the touch input and the first vibration element; and
controlling the first vibration element to emit the vibration pattern that is changed based on the determined third intensity value.

13. The method of claim 12, wherein the first housing includes a first corner and a second corner,
wherein the second housing includes a third corner and a fourth corner,
wherein in a folded state, the first corner and the third corner face each other, and the second corner and the fourth corner face each other,
wherein the first motion sensor is disposed adjacent to the first corner, and
wherein the second motion sensor is disposed adjacent to the fourth corner.

14. The method of claim 12, wherein each of the first motion sensor and the second motion sensor includes an acceleration sensor.

15. The method of claim 14, wherein the acceleration sensor has six degrees of freedom (DOF).

16. The method of claim 15, further comprising:
detecting a state of the foldable electronic device using the first motion sensor and the second motion sensor, and
wherein the state of the foldable electronic device includes an orientation of the foldable electronic device and an angle between the first housing and the second housing.

17. The method of claim 16, wherein the foldable electronic device includes a second vibration element disposed adjacent to the second motion sensor in the second housing, the method further comprising:
determining whether the angle between the first housing and the second housing is within a specified range, based on the first intensity value and the second intensity value,
determining whether one of the first housing and the second housing is used as a bottom surface of the foldable electronic device, based on the first intensity value and the second intensity value, and
emitting a vibration using one of the first vibration element and the second vibration element that belongs to a portion of the foldable housing that does not correspond to the bottom surface, when it is determined that the angle is within the specified range and one of the first housing and the second housing is used as the bottom surface.

\* \* \* \* \*